: 3,019,182
REGENERATION OF A NITROGEN BASE
CONTAINING ION EXCHANGER
Jayarajan Chanmugam, Princeton, N.J., assignor to Shell
Oil Company, a corporation of Delaware
No Drawing. Filed Aug. 15, 1958, Ser. No. 755,145
Claims priority, application Netherlands Aug. 29, 1957
4 Claims. (Cl. 208—254)

This invention relates to the removal of nitrogen bases from hydrocarbon streams employing ion exchangers and is useful in the refining of crude oil fractions and products, such as cracked gasolines. The process of the invention in particular pertains to the regeneration of the spent ion exchanger to facilitate the removal of the nitrogen bases.

Among the objectionable nitrogen materials found in petroleum products are, for example, the aryl and alkyl amines, complex derivatives of pyridine, pyrrole, pyrazole and quinoline. These nitrogen compounds which are often present in cracked and straight run gasolines are partially responsible for intake manifold fouling in internal combustion engines. Various schemes have been proposed for the removal of nitrogen bases with perhaps the most popular process being hydrodesulfurization, but unfortunately that process leads to severe loss of octane number in the case of gasoline. Another possible process is the thiocaptor method for removing nitrogen bases, but it has been generally considered to be too expensive since the process requires redistillation.

The use of cationic ion exchange resins for this purpose has many advantages in its favor. For example, the process involves the use of non-corrosive solid particles which are especially suitable for column operation. It has been demonstrated that the resins have a reasonable capacity for the basic constituents and furthermore, the gum content of the treated petroleum product does not deteriorate, indicating that polymerization and condensation reactions are no problem. However, the ion exchange process, despite its attractive features, has not been widely adopted for the removal of nitrogen bases, with a chief reason being the slowness of the regeneration step.

The resin or other cation exchangers used for the nitrogen base removal is in its hydrogen ion or proton (H+) form. The exchanger may be viewed as a solid, strong acid of a strength comparable to that of the usual mineral acids, with the proton (which confers the acid property) being mobile so that it can be replaced or exchanged by a suitable cation. It is believed that when a nitrogen base (e.g. $R_3N$ of the equation below) approaches the proton, the base ionizes under the polarization influence of the associated electrical fields, and the proton is transferred from the resin to the base resulting in the formation of an ammonium type ion, $[N(R_3)H]^+$. This ammonium type ion, which now possesses the positive charge of the proton, moves out of the hydrocarbon product to the resin and is held in place of the original proton. The exchange process may be summarized in the following equation:

Resin $-SO_3-H^+ + R_3N \rightarrow$ resin $-SO_3-[N(R)_3H]^+$

In the regeneration portion of the cycle the ammonium type ion is removed and a hydrogen ion (proton) returned to the exchanger, thereby placing it in a form again suitable for the removal of nitrogen bases from a further quantity of the hydrocarbon product. Regeneration of a spent resin or other cation exchangers may be achieved by contacting the exhausted resin with a considerable excess of dilute strong acid for a relatively long time. The experience has been that the regeneration of the exchanger is the more time consuming portion of the cycle and that its efficiency determines the cycle time of the process.

If the regeneration time could be speeded up, the process would likely be more widely used. A practical industrial process demands that the regeneration phase of the cycle be of substantially the same order of duration (or less) as the nitrogen base removal step so that the cycle time of the operation is not unduly long.

It is an object of the present invention to provide a process for accelerating the regeneration of ion exchangers containing nitrogen bases.

A further object is to furnish a process which requires a smaller volume of the acid regenerating liquid, thereby minimizing the expense of storage vessels, pumps and other equipment.

Another object is to afford a process permitting the use of an acid regenerating liquid of lower acid content to reduce corrosive damage.

A still further object of the invention is to provide a process which lengthens the cycle life of the regeneration liquid so as to minimize the inventory of acid and increase the efficiency of the process.

These and other objects will become more apparent from the following description of the invention.

It has now been discovered that a spent cation exchanger containing nitrogen bases as ammonium type ions removed in an earlier treatment of a hydrocarbon oil may be regenerated in a length of time considerably shorter than heretofore possible. Generally speaking, in the improved process it is contemplated washing the spent exchanger with an aqueous treating liquid containing both (1) a positive charge ion having a stronger affinity for the resin than the nitrogen base ammonium type ion, thereby replacing the ammonium type ion with the positive charge ion and (2) an organic surface active agent soluble in the treating liquid and present in an amount effective to facilitate the removal of the nitrogen bases from the exchanger. Hydrocarbon oil places the spent exchanger in a form which makes the removal (regeneration) of the ammonium ion much more difficult than in the instance where the regeneration is that of a spent exchanger employed say for the removal of a material from an aqueous solution. The surface active agent remedies this situation and also appears to increase the solubility of the removed nitrogen bases in the aqueous treating or regenerating liquid.

More particularly, the process involves washing the exhausted cation exchanger with a treating agent selected either from the group consisting of a dilute strong acid, such as hydrochloric or sulfuric acid or an aqueous solution of a salt of a strong acid having a positive charged ion selected from the group consisting of alkali metal or ammonium radical, along with an effective amount of the organic surface active agent (surfactant). Where the treating solution contains only the salt of the strong acid and the surfactant, it will be necessary to follow the initial treatment with an aqueous washing liquid containing an acid in order to place the cation exchanger in its hydrogen form ready for nitrogen base removal. As will be shown in the experiments of the example, there is an advantage in this two-step operation over the conventional acid wash incorporating no surface active agent. However, in the preferred embodiment of the process, the treating liquid contains both the dilute strong acid and the salt of the strong acid, along with the surfactant. This latter embodiment provides the greatest acceleration of the regeneration phase.

The process of the invention is generally applicable to the regeneration of all cation exchange materials. Preferably, the cation exchanger is an organic hydrogen ion exchanger having a relatively high molecular weight and composed of a water-insoluble resin or carbonaceous material containing a functional group, such as —OH, —$SO_3H$, —COOH or two or more of such groups.

Among the suitable cation exchangers are the sulfonated coals (e.g. Zeo-Karb manufactured by the Permutit Company) which are produced by treatment of bituminous coal with sulfuric acid. The sulfonated coals are popularly used as zeolitic water softeners and are usually available in a neutral form and hence, in order to be employed in the present process, must be placed in their hydrogen form by treatment with a suitable acid. Following acidification, the sulfonated coal water should be washed to remove the sodium or chloride ion before use in the process of the invention. It may be necessary with other types of cation exchange materials as in the instance of the sulfonated coals, to place them initially in their hydrogen form. This may be accomplished usually in a like manner. Particularly suitable cation exchange materials are the resins having sulfonic groups therein, such as the sulfonated divinyl aryl resins, for example, sulfonated divinyl benzene resins, sulfonated styrene-divinyl benzene resins, and sulfonated phenolformaldehyde resins. A preferred cation exchanger is the material known as Amberlite IR-120, manufactured by Rohm and Haas Company, which is a polystyrene nuclear sulfonic acid type resin produced from the copolymer of styrene with divinyl benzene. Other resins useful include the sulfonated resinous polymers of coumarone-indene with cyclopentadiene, sulfonated polymers of coumarone-indene with furfural, sulfonated polymers of coumarone-indene with cyclopentadiene and furfural, sulfonated polymers of cyclopentadiene with furfural. The sulfonated tannin-formaldehyde resins may also be used. Other types of resins that may be utilized are those containing carboxyl groups, such as the copolymers of divinyl benzene and acrylic or methacrylic acid; and those whose resin structures include phosphonic or phosphonous acid group fastened to a hydrocarbon structure.

The surface active agent needed for the process can be any of the various ones of the water-soluble surface active agents, ionic or non-ionic but preferably an anionic material. The book Surface Active Agents, Schwartz and Perry, Interscience Publishers, Inc., 1949, list many materials of this type and reference thereto will supply other surfactants in addition to those mentioned below.

The preferred water-soluble, surface active materials that may be utilized in the process are the sulfuric esters, such as the sulfonated oils and the alkyl aromatic sulfonates type. Materials of either of these two types may be advantageously used but surfactants of other different classes will do the job. The sulfonated oils include, for example, sulfonated castor and olive oil and sulfonated tallow. The sulfated esters and acids represented by ricinoleic or oleic acid esterified with a low molecular weight alcohol and then sulfated make a suitable surfactant. The propyl, butyl and amyl esters of both ricinoleic and oleic acid are also available in their sulfated forms and may be employed for the present purpose. Instead of esterifying the free carboxyl group of the ricinoleic or oleic acids, it may be reacted with ammonia or an amine to produce an amide which in turn may be sulfated, supplying a suitable material for the present process.

The sulfated long chain alcohols, such as the material manufactured from a mixture of fatty alcohols obtained by the splitting of coconut oil may be utilized. This mixture is commonly called sulfonated coconut fatty alcohol. A preferred sulfuric ester type are the surfactants commonly known as the sulfated olefins. This material may be petroleum derived and is produced by subjecting a paraffin wax to a cracking process and distilling to separate out a suitable cut of the long chain olefins. This cracked material is then sulfonated. Sulfuric ester surfactants having intermediate linkages between the sulfate group and the hydrophobic group may also be used.

A preferred type of surfactant includes the alkyl aromatic sulfonates represented by alkyl naphthalene sulfonates such as propylated or butylated naphthalene sulfonates. The alkyl aromatic sulfonates are particularly adaptable for use in the process and among these are the surfactants produced from the kerosene fraction of petroleum. The fraction is chlorinated supplying a mixture of alkyl chlorides which are then condensed with benzene and subsequently sulfonated. This type of surfactant is widely used for many purposes and consequently readily available. Besides benzene, the lower homologs of benzene, such as toluene and the xylenes are also used for the alkylation. The Schwartz and Perry book, supra, at page 126 in Table 1 provides a list of alkyl aromatic sulfonates which may be employed with varying degrees of adaptability in the process. Cationic surface active agents of the water-soluble type as some of the quaternary ammonium compounds are available for use as well as the water-soluble non-ionic surface active agents, such as the product produced by condensing several moles of ethylene oxide with an alkylated beta naphthyl.

The amount of surface active agent required varies widely with type but will generally be in the range of 0.001 to 1% by weight of the treating (regenerating) liquid, although lower or higher concentrations may be effective, depending on the wetting and solubilizing characteristics of the particular surface active agent used.

The acids used are preferably mineral acids, for example, hydrochloric acid, sulfuric acid, or phosphoric acid. Examples of the alkali metal or ammonium salts are the sulfates, the chlorides and the nitrates. Suitable quantities of the acid or salt used in the regeneration phase of the cycle will generally be in the range of from 2–5 times the quantity equivalent to the theoretical maximum capacity of the ion exchanger in the instance where the materials are used separtately. In the case, where a small amount of salt is incorporated in a dilute strong acid treating solution, the quantity of salt employed is usually not greater than the equivalent of the theoretical maximum capacity of the ion exchanger. The concentration of the acid or salt separately employed for regeneration is normally in the range of 5–25% by weight. However, concentrations outside these limits may be used in some instances. When the regeneration is accomplished by an acid containing an additional minor quantity of the salt, the concentration of the salt is usually below 5% by weight.

The regeneration of the ion exchanger with the acid or the salt in accordance with the process of the invention may be carried out in various ways. For instance, the total quantity of the ion exchanger undergoing regeneration may be mixed with the total quantity of the regenerating solution and a separation made after the ion exchanger has been contacted with the solution for a sufficiently long period to complete the removal of the nitrogen bases. In another embodiment, the regenerating solution may be circulated through a column filled with the ion exchanger. The system in the latter embodiment may be designed to recycle the treating liquid several times through the column or in a preferred modification the velocity of the liquid and the heighth and resistance of the column are so related that the regeneration is attained with a single pass of the regenerating liquid. The regeneration according to the invention generally takes place at room temperature, although the process may be conveniently carried out at somewhat higher and lower temperatures.

EXAMPLE

This example with its 17 experiments demonstrates the advantage to be had in the use of the surface active agent in the process of the invention. Each experiment utilized 10 grams of a sulfonated copolymer of styrene with divinyl benzene (Rohm and Haas Amberlite 120) as the ion exchanger contained in a column having an internal diameter of 1 cm. with the height of the copolymer resin bed being approximately 30 cms. The resin which is commercially available in its sodium form was placed in its hydrogen form by treatment with a dilute hydrochloric acid. Following this, distilled water was passed through the hydrogen material until the washing water was free from acid. The resin particles which were spheroid were sieved so as to obtain those between 20 and 50 mesh.

The catalytic cracked gasoline from which the nitrogen bases were removed was produced from a Venezuelan feed stock. The gasoline had a nitrogen base content of 6.2 milliequivalents per liter (nitrogen content of 116 p.p.m.). In each experiment gasoline was circulated at a constant hourly space velocity for six hours through the bed and during this period the several beds took up between 25.2 and 25.6 milliequivalents of the nitrogen bases. Ten grams of the resin has approximately 42.2 milliequivalents maximum capacity. The resin in each experiment was about 60% saturated with the nitrogen bases. In order to place the ion exchanger in a more suitable form for regeneration, the bed in each experiment was first backwashed by a stream of water introduced at the bottom of the column. With this backwash, most of the gasoline was removed from the resin prior to regeneration and entire resin mass uniformly distributed throughout the column. The resin was then regenerated. The surface active agent used in several of the regenerating solutions comprised 55% by weight of sodium dodecyl benzene sulfonic acid (prepared from a tetramer of propylene) with the remainder being sodium sulfate.

In each of the experiments, a solution from the list below was passed through the ion exchanger column from top to bottom at a constant space velocity for the indicated number of hours with the liquid collected at the bottom being returned continuously to the top. In some experiments it will be seen that two different solutions were successively circulated through the ion exchange for the periods of time shown.

The table tabulates the results of the several experiments for ease of comparison and shows the quantity of nitrogen base removed from the ion exchanger in each experiment, and the extent to which the sodium or ammonium ions were taken up or given up by the ion exchanger.

Solution $a$ consists of 43.8 milliliters of 10% HCl (hydrochloric acid). The milliequivalents (m. eq.) of HCl in this solution is 126, three times the m. eq. capacity of the resin.

Solution $b$ is made up of 68.7 milliliters of 10% sodium chloride. The m. eq. of NaCl present in the solution is three times the maximum m. eq. capacity of the resin.

Solution $c$ contains 43.8 milliliters of 10% HCl mixed with 0.44 milliter of the solution of 1% by weight of the surface active agent.

Solution $d$ comprises 68.7 milliliters of 10% NaCl mixed with 0.69 milliliter of a solution of 1% by weight of the surface active agent.

Solution $d'$ is made up of 13.7 milliliters of 10% NaCl mixed with 0.14 milliliter of a solution of 1% by weight of the surface active agent.

Solution $e$ contains 228 milliliters of 10% ammonium chloride (440 m. eq. of $NH_4Cl$) mixed with 0.23 milliliter of a solution of 1% by weight of the surface active agent.

Solution $f$ is a mixture of Solution $c$ (that is, dilute HCl and the surfactant) with 10.9 milliliters of 10% $NH_4Cl$ (2 m. eq. of $NH_4Cl$) and 0.11 milliliter of a solution of 1% by weight of the surface active agent.

Solution $g$ is a mixture of Solution $c$ (dilute HCl and the surfactant) with Solution $d'$ (NaCl solution containing the surfactant).

The several experiments described in the succeeding paragraphs are compared in the table and in each instance the nitrogen bases are removed from the Venezuelan catalytic cracked gasoline in the manner described previously to provide a spent resin bed containing from 25.2 to 25.6 m. eq. of nitrogen bases.

*Experiment 1.*—Solution $a$ was circulated through the 10 grams resin bed for three hours. The dilute HCl solution removed 3.7 m. eq. of the nitrogen bases from the bed, giving a 14.7% removal.

*Experiment 2.*—The same strength dilute acid solution was recycled through a comparable spent resin for six hours. In this instance, 6.8 m. eq. of nitrogen bases was eluded from the spent bed, effecting a 26.9% removal.

*Experiment 3.*—Solution $c$ of this experiment differs from Solution $a$ of Experiment 1 in having a small amount of the surfactant dissolved therein. Solution $c$ was passed through the bed for three hours, effecting a 23% removal (5.8 m. eq.) of the nitrogen bases. It will be noted that the percentage removal of the nitrogen material is significantly greater in the present experiment over that elutiated in Experiment 1.

*Experiment 4.*—Solution $b$ of this experiment contains 10% sodium chloride in water. Again, the solution was recirculated through the spent resin bed for three hours and in this instance there was a 4.6 m. eq. removal of the nitrogen bases, representing an 18.2% removal. The resin now contains 10.1 m. eq. of sodium ion which must be removed by treatment with acid if this bed is to be used for further stripping of the nitrogen bases from a hydrocarbon oil.

*Experiment 5.*—In this experiment Solution $b$ was circulated through the spent bed for three hours and followed by a three hour washing with Solution $a$. Solution $b$, it will be recalled, contains sodium chloride dissolved in water and solution $a$ contains the dilute acid. At the end of the first three hours, 4.6 m. eq. had been removed (an 18.2% removal) and at the end of the next three hour washing with Solution $a$, there was a total nitrogen base removal of 8.8 (34.9% total removal). The net amount of the sodium ion contained in the resin after this six-hour two solution treatment was 1.3 m. eq.

*Experiment 6.*—Here Solution $d$ containing 13.7 ml. of 10% sodium chloride mixed with an effective amount of the surface active agent was circulated through a spent bed for three hours, removing 6.0 m. eq. of nitrogen bases. At the end of this treatment the bed contained 12.6 m. eq. of the sodium ion which would have to be removed by treatment with acid before the bed would be in its hydrogen form.

*Experiment 7.*—Here the spent bed is subjected to two three-hour successive treatments with Solutions $d$ and $c$. 11.5 m. eq. (45.4%) of the nitrogen bases are removed. The regenerated bed contains 0.7 m. eq. of sodium ion.

*Experiment 8.*—Solution $d'$ was passed through the bed for three hours to remove 1.1 m. eq. of the nitrogen bases. This represents a 4.4% removal.

*Experiment 9.*—The bed was subjected to two successive three-hour washings with Solutions $d'$ and $c$. The total m. eq. of nitrogen bases removed is 6.7 (26.5%).

*Experiment 10.*—Solution $g$ containing HCl, NaCl and surfactant was circulated through a spent bed for three hours to accomplish removal of 7.8 m. eq. nitrogen bases (30.5%). Here the regenerated bed contained 3.0 m. eq. of the sodium ion.

*Experiment 11.*—Solution $f$ which is made up of the dilute acid, $NH_4Cl$ and the surfactant was recycled through a spent resin bed for a period of three hours, achieving a removal of 8.6 m. eq. of the nitrogen bases. This represents a 33.9% removal which is somewhat superior to the results of experiment 10 which used sodium chloride as the added salt to the dilute acid. The regenerated bed contained 3.0 m. eq. of the ammonium ion.

*Experiment 12.*—Solution $e$ made up of 10% ammonium chloride in water and a small amount of surfactant was passed through a nitrogen base containing resin for two hours, achieving an 8.0 m. eq. removal (31.2%) of the nitrogen materials. The bed retained 26.3 m. eq. of the ammonium ion.

*Experiment 13.*—Here Solutions *e* and then *c* were recycled consecutively for two and three hours through a spent resin. The total nitrogen bases removed was 14.0 m. eq., representing a 54.6% removal. At the end of the regeneration treatment the bed had been completely swept free of the ammonium ion.

*Experiment 14.*—Here Solution *e* was recycled through a spent resin for two hours to remove 8.0 m. eq. of the nitrogen bases (31.5%). The bed retained 26.2% ammonium ion.

*Experiment 15.*—In this experiment Solution *e* was recycled through the bed for two hours, followed by a three hour wash with Solution *f*. A total of 16.2 m. eq. of the nitrogen bases were removed (63.8%). The bed retained substantially none of the ammonium ion.

*Experiment 16.*—Solution *e* was recycled through a spent bed for one hour to effect a removal of 4.0 m. eq. of the nitrogen base (15.8%). The bed retained 17.7 m. eq. of the ammonium ion.

*Experiment 17.*—Here the bed was subjected to a one hour washing with Solution *e*, followed by a four hour regenerating wash with Solution *f*, giving a total regeneration period of five hours. The total nitrogen bases removed was 16.2 m. eq. (63.8%). Here again, there was substantially none of the ammonium ion left in the regenerated bed.

*Table*

| Experiment | Solution | Duration, hours | Nitrogen bases removed M. eq. | Nitrogen bases removed Percent | Cations taken up or given off, m. eq. |
|---|---|---|---|---|---|
| 1 | a | 3 | 3.7 | 14.7 | |
| 2 | a | 6 | 6.8 | 26.9 | |
| 3 | c | 3 | 5.8 | 23.0 | |
| 4 | b | 3 | 4.6 | 18.2 | 10.1 Na+ |
| 5 | b and then a | Each 3 Total—6 | b—4.6 a—4.2 Total—8.8 | b—18.2 a—16.7 Total—34.9 | b—10.1 Na+ a—8.8 Na+ Net—1.3 Na+ |
| 6 | d | 3 | 6.0 | 23.7 | 12.6 Na+ |
| 7 | d and then c | Each 3 Total—6 | d—6.0 c—5.5 Total—11.5 | d—23.7 c—21.7 Total—45.4 | d—12.6 Na+ c—11.9 Na+ Net—0.7 Na+ |
| 8 | d' | 3 | 1.1 | 4.4 | |
| 9 | d' and then c | Each 3 | d'—1.1 c—5.6 Total—6.7 | d'—4.4 c—22.1 Total—26.5 | |
| 10 | g | 3 | 7.8 | 30.5 | 3.0 Na+ |
| 11 | f | 3 | 8.6 | 33.9 | 3.0 NH4+ |
| 12 | e | 2 | 8.0 | 31.2 | 26.3 NH4+ |
| 13 | e and then c | e—2 c—3 Total—5 | e—8.0 c—6.0 Total—14.0 | e—31.2 c—23.4 Total—54.6 | e—26.3 NH4+ c—26.3 NH4+ Net—0.0 NH4+ |
| 14 | e | 2 | 8.0 | 31.5 | 26.2 NH4+ |
| 15 | e and then f | e—2 f—3 Total—5 | e—8.0 f—8.2 Total—16.2 | e—31.5 f—32.3 Total—63.8 | e—26.2 NH4+ f—26.2 NH4+ Net—0.0 NH4+ |
| 16 | e | 1 | 4.0 | 15.8 | 17.7 NH4+ |
| 17 | e and then f | e—1 f—4 Total—5 | e—4 f—12.2 Total—16.2 | e—15.8 f—48.0 Total—63.8 | e—17.7 NH4+ f—17.7 NH4+ Net—0.0 NH4+ |

It is recommended that the nitrogen base containing resin bed be first contacted with an acid regenerating solution that is most spent, then progressively with less spent acid solutions and finally with the fresh solution. The several experiments of the example show that it is possible with the practice of the invention to reduce the regeneration phase of the cycle significantly over that required in the absence of the surface active agent. The preferred regenerating solution contains both a dilute strong acid, say hydrochloric acid, and an alkali metal or ammonia salt of a strong acid, e.g. ammonium chloride, along with the surface active agent which is desirably an alkali metal salt of a sulfonic acid or an alkali metal salt of a sulfated olefin. A particularly satisfactory class of ion exchangers are the sulfonated resins, such as the sulfonated copolymer of styrene with divinyl benzene.

I claim as my invention:

1. A process for refining a liquid hydrocarbon stream containing organic nitrogen bases comprising the steps of contacting the hydrocarbon stream with a sulfonated resin cation exchanger substantially in the hydrogen form and characterized by its high mobility protons whereby nitrogen bases are retained as organic ammonium ions by the exchanger, removing the resulting refined hydrocarbon stream from the exchanger and contacting the exchanger bearing organic ammonium ions with an aqueous solution containing 5–25% by weight of a proton donating material of the group consisting of strong mineral acids, alkali metal salts of strong mineral acids, inorganic ammonium salts of strong mineral acids and mixtures thereof, said aqueous solution also containing 0.001–1% by weight of a surface active agent of the group consisting of alkali metal salts of alkylated aromatic sulfonic acids and alkali metal salts of sulfated olefins to effect regeneration of said exchanger to the hydrogen form.

2. A process in accordance with claim 1 wherein the surface active agent is an alkali metal salt of an alkylated aromatic sulfonic acid.

3. A process in accordance with claim 1 wherein the surface active agent is an alkali metal salt of a sulfated olefin.

4. A process for refining a liquid hydrocarbon stream containing organic nitrogen compounds comprising the steps of contacting the hydrocarbon stream with a sulfonated copolymer of styrene with divinyl benzene, said copolymer being a cation exchanger substantially in hydrogen form, whereby nitrogen bases are retained as organic ammonium ions by the exchanger, removing the resulting refined hydrocarbon stream from the exchanger and contacting the exchanger with an aqueous solution containing 5–25% by weight of hydrochloric acid and ammonium chloride and 0.001–1% by weight of sodium dodecyl benzene sulfonic acid to effect regeneration of said exchanger to the hydrogen form.

References Cited in the file of this patent

UNITED STATES PATENTS 2,766,178    Johnstone    Oct. 9, 1956

OTHER REFERENCES

Kunin: Ion Exchange Resins, 2nd ed., pp. 314 and 315, Wiley, N.Y., February 1958.

Kunin et al.: "Ion Exchange Resins," Wiley (1950), page 96.

Nachod: "Ion Exchange," Academic Press (1949), page 370.